(12) United States Patent  
Romain et al.

(10) Patent No.: US 7,400,723 B2
(45) Date of Patent: Jul. 15, 2008

(54) SECURE METHOD FOR SECRET KEY CRYPTOGRAPHIC CALCULATION AND COMPONENT USING SAID METHOD

(75) Inventors: Fabrice Romain, Aix-En-Provence (FR); Yannick Teglia, Marseilles (FR)

(73) Assignee: STMicroelectronics SA, Montrouge (FR)

( * ) Notice: Subject to any disclaimer, the term of this patent is extended or adjusted under 35 U.S.C. 154(b) by 866 days.

(21) Appl. No.: 10/467,572

(22) PCT Filed: Feb. 6, 2002

(86) PCT No.: PCT/FR02/00454

§ 371 (c)(1),
(2), (4) Date: Dec. 5, 2003

(87) PCT Pub. No.: WO02/063822

PCT Pub. Date: Aug. 15, 2002

(65) Prior Publication Data

US 2004/0071291 A1    Apr. 15, 2004

(30) Foreign Application Priority Data

Feb. 8, 2001    (FR) .................................. 01 01684

(51) Int. Cl.
*H04K 1/00*    (2006.01)

(52) U.S. Cl. ............................. 380/28; 380/37; 380/43; 380/44; 380/255; 380/282; 713/153; 713/185

(58) Field of Classification Search ............. 380/28–29, 380/252, 205–209, 37, 259, 268, 43–44, 380/255, 282; 713/174, 153, 185
See application file for complete search history.

(56) References Cited

U.S. PATENT DOCUMENTS

| 5,949,884 | A | * | 9/1999 | Adams et al. ................. 380/29 |
| 6,064,740 | A | * | 5/2000 | Curiger et al. ............... 380/265 |
| 7,000,111 | B1 | * | 2/2006 | Dent et al. ................... 713/174 |

FOREIGN PATENT DOCUMENTS

| DE | 198 22 217 | 11/1999 |
| EP | 1 109 350 | 6/2001 |
| JP | 2000-066585 | 3/2000 |
| WO | 99/48239 | 9/1999 |
| WO | 99/67919 | 12/1999 |
| WO | 2000-54454 | 9/2000 |

* cited by examiner

*Primary Examiner*—Thanhnga B Truong
(74) *Attorney, Agent, or Firm*—Lisa K. Jorgenson; Allen, Dyer, Doppelt, Milbrath & Gilchrist, P.A.

(57) ABSTRACT

A secured method of cryptographic computation to generate output data from input data and from a secret key includes a derived key scheduling step to provide a derived key from the secret key according to a known key scheduling operation. The method also includes a masking step, performed before the derived key scheduling step, to mask the secret key so that the derived scheduled key is different at each implementation of the method. The present method and component can be used in transfer type applications, such as bank type applications.

27 Claims, 3 Drawing Sheets

SECURE METHOD FOR SECRET KEY CRYPTOGRAPHIC CALCULATION AND COMPONENT USING SAID METHOD

FIELD OF THE INVENTION

The present invention relates to a component and secured method for cryptographic computation with a secret or private key, and more particularly, to the protection of such components against an SPA (Simple Power Analysis) type physical attack which are designed to obtain information on the secret or private key through the power consumption or the electromagnetic radiation of the component when it implements the encryption method.

BACKGROUND OF THE INVENTION

Components with strictly controlled access to the services and/or to the data typically have an architecture formed around the microprocessor and a program memory including the secret key. Such components are used for example in smart cards, especially for banking applications, via a control terminal or remote terminal. Such components use one or more secret key encryption or private key encryption methods to compute an output data from an input data. Such a method is used for example to encipher, decipher, authenticate or sign an input message or else verify the signature of the input message.

To ensure the security of the transactions, the secret key or private key encryption methods are constructed in such a way that it is not possible to determine the secret key used from the knowledge of the input data and/or the output data of the algorithm. However, the security of a component relies on its capacity to keep the secret key that it uses concealed, for this key cannot be modified.

One method frequently used is the DES (Data Encryption Standard) type method. This method can be used for example to give an enciphered message MS (or output data) encoded on 64 bits, from a plaintext message ME (or input data) also encoded on 64 bits, and a secret 56-bit key $K_0$. The main steps of the DES are described in detail with reference to FIG. 1. After an initial permutation IP, the block formed by the permutated bits of the input data is separated into a left-hand part $L_0$ and a right-hand part $R_0$.

Figure 1:
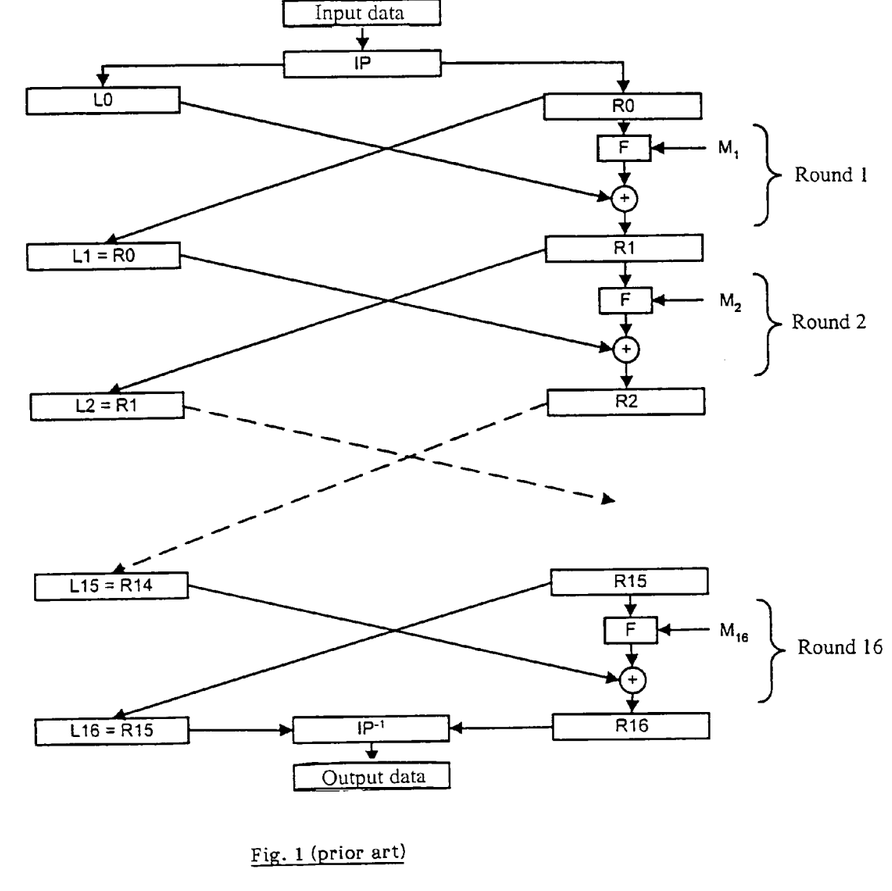
FIG. 1, which has already been described, is a flow diagram illustrating a known encryption method using a secret key.

After this, 16 rounds of identical operations are performed. During each round of operations, the right-hand part ($R_0, \ldots, R_{15}$) of an intermediate data computed during the previous round of operations is combined with a derivative key ($M_1, \ldots, M_{16}$) during a transformation called a transformation F. The result of the transformation F is then added (XOR operation) to the left-hand part ($L_0, \ldots, L_{15}$) of the intermediate data computed during the previous round of operations.

After the $16^{th}$ round of operations, the left-hand part $L_{16}$ and right-hand part $R_{16}$ of the $16^{th}$ intermediate data are assembled and a final permutation $IP^{-1}$, which is the inverse of the initial permutation IP, terminates the procedure. An i-ranking round of operations included between 1 and 16 is described in detail with reference to FIG. 2. The 56 bits of an intermediate key $K_{i-1}$ computed during the previous round are shifted (operation $S_i$) to give a new updated intermediate key $K_i$, then 48 bits out of 56 are selected by an operation PC of permutation/compression to provide a derived key $M_i = M_i = PC(K_i) = PC(S_i(K_{i-1}))$. The association of the steps PC and $S_i$ forms a key computation step ET2.

Figure 2:
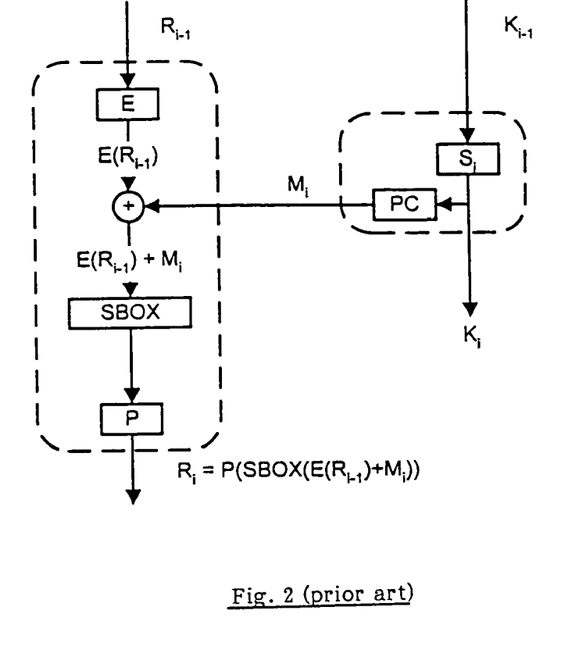
FIG. 2 which has already been described is a schematic drawing detailing a step of the method of FIG. 1.

In parallel, the transformation F is carried out. The right-hand part $R_{i-1}$ of a piece of intermediate data computed during the previous round is extended to 48 bits by an expansion (operation E), combined with the derived key M by an XOR type operation, replaced by 32 new bits by a substitution operation (represented by the operation SBOX), then permutated once again (operation P). In practice, the operations F, P, E, PC, SBOX are identical for all the rounds. On the contrary, the operations $S_1$ to $S_{16}$ used during the computation of the derived keys $K_1$ to $K_{16}$ are different from one round to another.

All the characteristics of the operations IP, $Ip^{-1}$, P, PC, E, SBOX, $S_i$ performed during the implementation of a DES method are known: the computations made, the parameters used, etc. These characteristics are, for example, described in detail in the patent application WO 00/46953 or in the "Data Encryption Standard, FIPS PUB 46", published on 15 Jan. 1977.

The security of a component using an secret key or private key encryption method lies in its capacity to keep the key that it uses secret, especially when it undergoes SPA type analysis. In an SPA analysis, the component is made to execute several time the encryption method that it uses by applying the same input data ME, and, for each execution of the method, the trace left by this execution is measured as a function of time. The trace represents, for example, the power consumption of the component or the electromagnetic energy radiated as a function of time. The set of measurements are then averaged to eliminate the noise from the measurement and obtain the real trace of the circuit for a fixed input data ME. For example, a set of 10 to 1000 identical measurements may be enough to eliminate the noise from the measurement and obtain the real trace of the component for a fixed input data ME.

Figure 3:
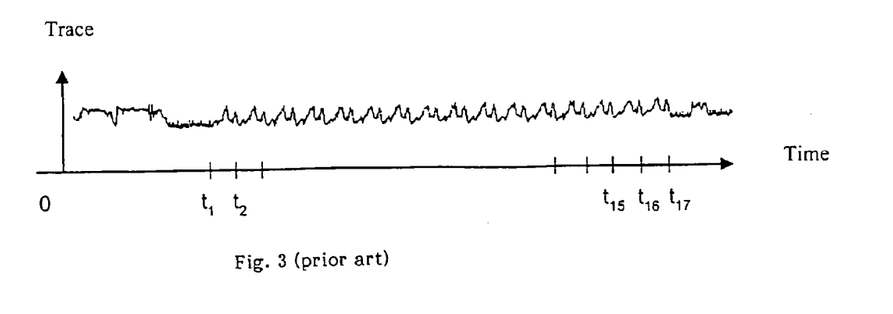
FIG. 3, which has already been described, is a graph illustrating the trace left by a component using the encryption method of FIG. 1, as a function of time.

The form taken by a trace such as this is shown in FIG. 3, in the case of a DES type method. This figure clearly shows the different steps of the DES method: initial permutation IP before the instant t1, 16 rounds of operation between the instant t2 and t1, t3 and t2, . . . , t17 and t16, and final permutation $IP^{-1}$ after the instant t17. As can be seen in the trace of FIG. 3, it is thus fairly simple to obtain information on the secret key used in the case of a component using a standard DES method. For example, it is possible, for each round of operations, to determine an image of a derived key $M_i$ by identifying the time interval during which a derived key transfer instruction is carried out before the execution of the XOR operation. Since all the derived keys $M_1$ to $M_{16}$ are obtained from the secret key $K_0$ by known operations, the knowledge of simple images of the derived keys provides information on the secret key.

More generally, all the encryption methods using secret keys are more or less sensitive to SPA type analysis. Their sensitivity is especially important during the performance of a critical step during which the secret key is used either directly or in a derived form obtained by a known law of derived key scheduling. A critical step of this kind is for example a derived key scheduling step during which an updated derived key $M_i$ is computed from a previously computed key $K_{i-1}$.

SUMMARY OF THE INVENTION

It is an object of the invention to implement a secured method for cryptographic computation with secret or private key that is immunized against any physical attack of the SPA type, namely a secured method of cryptographic computation whose trace, during the implementation of the method, gives no information on the key that it uses, whatever the input data used by the method, and whatever the number of uses of the method.

With this goal in view, the invention relates to a secured method of cryptographic computation to give an output data (MS) from an input data (ME) and from a secret key ($K_0$), the method comprising several derived key scheduling step (ET2), to provide each an updated derived key ($M'_1, M'_i$) from a previously computed derived key according to a known key scheduling law, a first updated derived key ($M'_1$) being obtained from the secret key ($K_0$).

According to the invention, the method also comprises a masking step (ET1), performed before a first key scheduling step (ET2), to mask the secret key ($K_0$) so that the updated derived scheduled key ($M'_1, M'_i$) is different at each implementation of the method.

The invention also relates to an electronic component using a secured method of cryptographic computation according to the invention.

The word "masked" (or "mixed") should be understood here and in the rest of the document in the following sense: in a method according to the invention, a data, a result, are said to be masked if they have a different value during two executions of the method, especially during two executions of the method using the same input data and the same secret key.

Thus, with a secured method of cryptographic computation according to the invention, a component that executes the method with the same input data twice gives two different traces, especially on a critical time interval corresponding to the trace left by a critical instruction of the method, which uses the derived key.

In other words, whatever the input data used, and even if the input data is identical during several cases of implementation of the secured cryptographic computation method according to the invention, the trace left by the component is always different from one implementation to another. To obtain this result, during the masking step, a randomly chosen masking parameter is mixed with the secret key, to give a masked secret key, the first derived key being computed from the masked secret key during the first key scheduling step. After the masking step, the non masked secret key may be erased, since it is no longer used. Only, the secret key is used during the next steps of the method. The security of the method is thus reinforced.

Thus, with the invention, the key actually manipulated during the implementation of the method is a random number because it is derived from a masking by a random number (the masking parameter). Consequently, the traces of the component using the method is itself random from one implementation of the method to another, simply because of the presence of the masking parameter which is randomly chosen before each implementation.

Consequently, even if several measurements of traces of the component are made in using identical input datas, the averaging of these measurements will lead to an average trace that is constant as a function of time (the average of a set of random traces), that gives no information on the value of the key used, even if critical operations are performed. Thus, with the invention, the component is completely immunized against any SPA type physical attack.

The invention thus uses a weak point of an SPA type attack, to protect the component. Indeed, if an SPA type attack is to succeed, namely if an SPA type attack is to provide information on the secret key used by the component, there should necessarily be a critical time interval for which the trace of the component is identical on this interval, possibly when the input data ME is identical, and during which the visible information is relevant, i.e. during which it represents all or part of the secret key and/or all or part of a key derived from the secret key.

The component of the invention gives different traces during each implementation of the method of the invention, even if the input data used is the same. Consequently, it is not possible to find a critical interval during which the visible information is relevant and identical from one implementation of the method to another. An SPA attack on the component therefore cannot provide information on the secret key.

According to an embodiment, the method of the invention also comprises: a computation step using the derived scheduled key or an updated derived key, and an unmasking step, executed after the computation step, to eliminate the contribution of the masking parameter on the result of the computation step.

According to another embodiment, the method of the invention comprises several computation steps, each using an updated derived key and an unmasking step is executed after each computation step, to eliminate the contribution of the masking parameter on the result of the preceding computation step.

During the masking step, the following operation is, for example, performed: $K'_0 = K_0 | X_0$, $K'_0$ being the masked secret key, $K_0$ being the secret key, $X_0$ being the masking parameter. The operator "|" is a mixing operator, preferably a two-parameter linear operator. In one example, the mixing operator is an XOR operator. During the unmasking step, an operator that is the inverse of the mixing operator is preferably used to remove the contribution of the masking parameter from the updated derived key.

According to a preferred embodiment of the invention, the method is a secured DES type method comprising 16 rounds of operations, each round of operations using an updated derived key. In one example, a single masking step is performed before a first round of the DES type method. In another example, a masking step is performed at the start of each round of the DES type method.

At each round of operations a transformation is performed, comprising a computation step to combine an intermediate data computed during the previous round and an updated derived key, and an unmasking step is performed after the computation step. Each masked updated derived key may be computed during the round of operations that uses it. Or else, all the derived keys may be computed elsewhere, independently of the rounds of operations that use them. They may, for example, be computed before or during a phase of initialization of the method.

BRIEF DESCRIPTION OF THE DRAWINGS

The invention will be understood more clearly and other features and advantages of the invention shall appear from the following description of exemplary forms of implementation of secured methods of cryptographic computation according to the invention. The description will be made with reference to the appended drawings, of which.

DETAILED DESCRIPTION OF THE PREFERRED EMBODIMENTS

Figure 4:
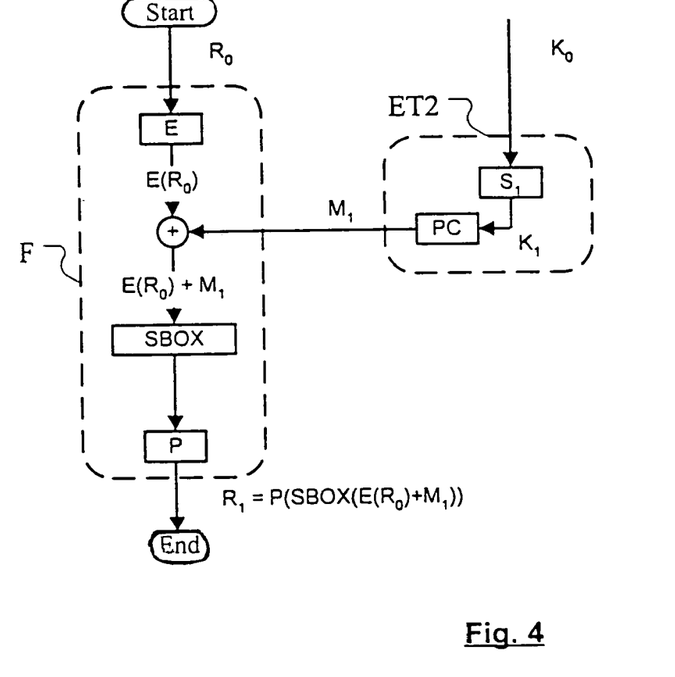
FIG. 4 is a schematic drawing illustrating a simplified encryption method.

In a first example described herebelow with reference to FIG. 4, the mthod is used to encode a 32-bit input data $R_0$, and give a 32-bit output data $R_1$ from a secret key $K_0$ and the input data $R_0$. The method can be subdivided into a derived key scheduling step ET2 and a transformation step F. The derived key scheduling step ET2 gives a derived key $M_1$ from the secret key $K_0$. The key scheduling step is formed by an operation $S_1$ for shifting the bits of the variable $K_0$, which gives $K_1=S_1(K_0)$ and a permutation/compression step PC. Thus, the derived key $M_1$ is obtained by the relationship: $M_1=PC(S_1(K_0))$.

The transformation step F gives the output data $R_1$ from the input data $R_0$ and from the derived key $M_1$. The transformation step F is identical to the step F of a standard DES type method and can be subdivided as follows. The data $R_0$ is extended from 32 to 48 bits by an expansion E, combined with the derived key $M_1$ by an XOR operation, replaced by 32 new bits during an operation of substitution SBOX then permutated again (operation P). Thus the output data $R_1$ is obtained by the relationship: $R_1=P(SBOX(E(R_0)+M_1))$.

Figure 5:
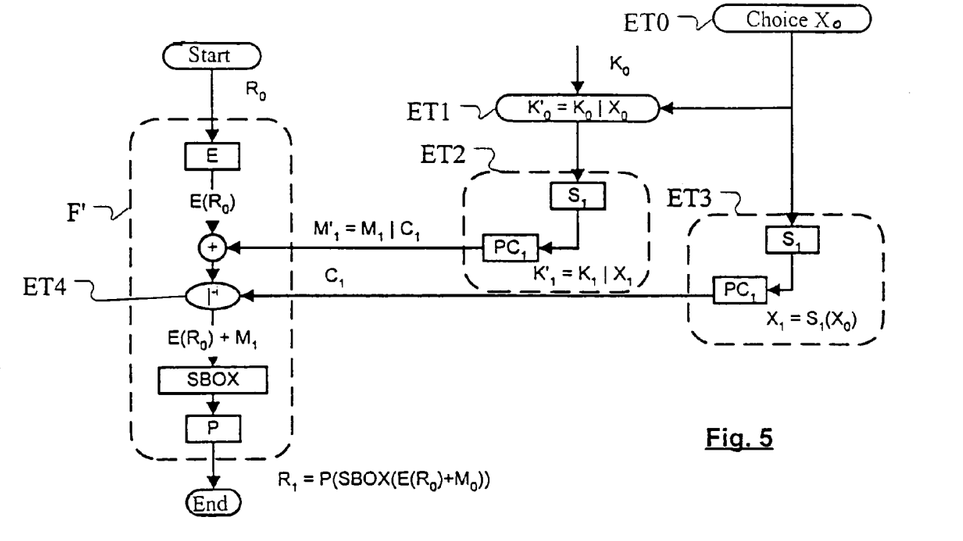
FIG. 5 is a schematic drawing illustrating the method of FIG. 4, secured according to the invention.

The method of FIG. 4 is secured according to the invention by the addition of an initialization ET0, a masking step ET1, a difference computing step ET3 and an unmasking step ET4 (FIG. 5). During the initialization step ET0, a masking parameter $X_0$ is chosen randomly. During the masking step ET1, performed after the initialization step ET0, the masking parameter $X_0$ is mixed with the secret key $K_0$, to give a masked secret key $K'_0$. The mixing is done by the following relationship: $K'_0=K_0|X_0$.

The operator "|" is chosen to be linear with respect to the two variables that it mixes. In one embodiment, the operator "|" is an XOR operator. The operator "|" may also be any type of linear operator. In general, the operator "|" has the following properties, whatever the data A, B, C:

"|" has second parity: it takes two arguments as parameters;
"|" verifies $$C(S(A|B))=PC(S(A))|PC(S(B));$$

"|" verifies $(A \oplus B)|C = A \oplus (B|C)$, $\oplus$ being the XOR operator.

There is an operator "$|^{-1}$", the inverse of "|", such that $(A|B)|^{-1} A=B$, possibly "|" and "$|^{-1}$" are identical.

The key scheduling step ET2 is then carried out from the secret key $K'_0$, to give a masked derived key $M'_1$. Thus, the masked, derived key is given by the relationship: $M'_1=PC(S_1(K'_0))=PC(S_1(K_0|X_0))=PC(S_1(K_0))|PC(S_1(X_0))$. The last equality is deduced simply from the fact that the operators PC, $S_1$ and "|" are linear operators. Since $PC(S_1(K_0))=M_1$ (see the example of FIG. 4), it is finally deduced therefrom that $M'_1=M_1|PC(S_1(X_0))$, M1 being the derived key computed according to the method of FIG. 4, non secured.

The difference computation step ET3 is carried out after the initialization step ET0. The step ET3 can be carried out before, in parallel with or after the key scheduling step ET2. The step ET3 determines the contribution $C_1$ given by the parameter $X_0$ to the masked derived key $M'_1$. The step ET3 is similar to the step ET2; the step ET3 thus comprises an operation $S_1$ to give a masking parameter $X_1=S_1(X_0)$ that is updated by shifting of the bits of $X_0$, and an operation PC to compute the contribution $C_1$. The contribution $C_1$ is thus computed according to the relationship: $C_1=PC(S_1(X_0))$. We finally deduce therefrom $M'_1=M_1|C_1$.

The unmasking step ET4 is a sub-step of the transformation step F' (which corresponds to the transformation F modified by the addition of the step ET4 according to the invention); the step ET4 is carried out between the operation of combination by an XOR operator and the non-linear substitution operation SBOX. The step ET4 seeks to remove the contribution $C_1$ given by the updated parameter $X_1$ on the result of the combination operation. For this purpose, the operator "$|^{-1}$" is used. This is the inverse linear operator of the operator "|". For example, if the operator "|" is an XOR, then the operator "$|^{-1}$" is also an XOR. At output of the step ET4, we have:

$$(E(R_0)+M'_1)|^{-1}C_1 = E(R_0)+M_1|C_1|^{-1}C_1 = E(R_0)+M_1$$

Thus, after elimination of the contribution $C_1$, the variable that appears at the input of the SBOX type operator is equal to $E(R_0)+M_1$, i.e. it is identical to the variable that appears at the input of the operator SBOX of a method that is similar (FIG. 4) but not secured according to the invention. Consequently, the output data that appears at output of the transformation step F' is identical to that appearing at output of the transformation operation F of the non-secured method of FIG. 4.

As discussed, the results given by the methods of FIGS. 4 and 5 are identical: the value of the output data is the same in both cases if the input data element and the secret key are the same.

Just as in the case of classic DES method, the method of FIG. 4 is sensitive to SPA attacks for the same reasons. Indeed, for one and the same secret key $K_0$, the value of the derived key $M_1$ is identical at each implementation of the method. An SPA attack is therefore possible by measuring the trace of the method, especially during the time interval between the key scheduling step ET2 and the transformation step F'.

By contrast, the method of FIG. 5 according to the invention is immunized against SPA type attacks. Indeed, for one and the same secret key value $K_0$, the value of the corresponding derived key $M'_1$ is always different from one implementation of the method to another because the masking parameter $X_0$, chosen randomly during the initialization of the algorithm, makes a random contribution $C_1$ to the derived key $M'_1$.

Thus, according to the invention, the method is protected against SPA attacks by the addition of a random masking parameter.

In another example, we consider the DES type method shown in FIGS. 1, 2. As seen here above, a DES type cryptographic method computes an output data MS from a secret key $K_0$ and an input data ME. The DES method comprises 16 rounds of operations, preceded by an input permutation IP and followed by an output permutation $IP^{-1}$, that is the inverse of the input permutation. Each round of operations comprises especially (FIG. 2) a derived key scheduling step ET2 and a transformation step F.

According to the invention, the DES method is secured (FIG. 6) by the addition of an initialization step ET0, a masking step ET1, and the addition, at each round of operations, of a difference computation step ET3 and an unmasking step ET4, similar to those of FIG. 5. With a view to clarity and simplification, only the $i^{th}$ round of operations has been shown in FIG. 6, i being an integer ranging from 1 to 16, with the characteristic steps ET0 to ET4 of the present invention.

During the initialization step ET0, a masking parameter $X_0$ is chosen randomly. During the masking step ET1, performed after the initialization step ET0, the masking parameter $X_0$ is mixed with the secret key $K_0$, to give a masked secret key $K'_0$, as in the above example. The mixing is done by the following relationship: $K'_0=K_0|X_0$.

In the $i^{th}$ round, the key scheduling step ET2 gives an i-ranking, masked derived key $M'_i$ from an i-ranking masked intermediate key $K'_{i-1}$, computed during the step ET2 of the preceding i−1 ranking round. The step ET2 includes an operation $S_i$ for shifting the bits of the previously computed masked intermediate key $K'_{i-1}$ and an operation PC. We have the following relationships:

$$K'_{i-1} = K_{i-1} \mid X_{i-1}$$

$$K'_i = S_i(K'_{i-1})$$

$$\begin{aligned}M'_i &= PC(K'_i) \\ &= PC(S_i(K'_{i-1})) \\ &= PC(S_i(K_{i-1} \mid X_{i-1})) \\ &= PC(S_i(K_{i-1})) \mid PC(S_i(X_{i-1})).\end{aligned}$$

The last equalities are deduced from the properties of the linear operators PC, $S_i$, "|". Furthermore, since $PC(S_i(K_{i-1}))$ =$M_i$ (see the example of FIG. 2), we finally deduce therefrom that:

$$M'_i = M_i \mid PC(S_i(X_{i-1})).$$

The difference computation step ET3 is performed after the initialization step ET0. The step ET3 may be performed before, in parallel or after the step ET2. The step ET3 updates the value $X_{i-1}$ of the masking parameter $X_0$ and then determines the contribution $C_i$ given by $X_{i-1}$ to the derived key $M_i'$. The step ET3 is similar to the key computation step ET2; the step ET3 comprises an operation $S_i$ to give $X_i$ by shifting of the bits of the parameter $X_{i-1}$, and an operation PC of permutation compression to give $C_i$. The contribution $C_1$ is thus computed according to the relationship: $C_i = PC(X_i) = PC(S_i(X_{i-1}))$. We finally deduce therefrom $M'_i = M_i \mid C_i$.

The unmasking step. ET4 is a sub-step of the transformation step F' (which corresponds to the transformation F modified by the addition of the step ET4 according to the invention); the step ET4 is carried out between the operation of combination by an XOR operator and the non-linear substitution operation SBOX. The step ET4 seeks to remove the contribution $C_1$ given by the updated masking parameter $X_i$, in using the operator "$|^{-1}$". After the step ET4, the variable that appears at the input of the SBOX type operator is equal to:

$$\begin{aligned}(E(R_{i-1}) + M'_i \mid^{-1} C_i &= E(R_{i-1}) + M_i \mid C_i \mid^{-1} C_i \\ &= E(R_{i-1}) + M_i\end{aligned}$$

It is therefore identical to the variable that appears at the input of the operator SBOX of a method that is similar (FIGS. 1, 2) but not secured according to the invention. Consequently, the data $R_i$ that appears at output of the transformation step F' is identical to the one that appears at the output of the transformation operation F of the non-secured DES method (FIGS. 1, 2).

Thus, with the DES method secured according to the invention, the computed intermediate data $L_i$, $R_i$, for i ranging from 1 to 16, are identical to those obtained by a standard DES method. By contrast, with the secured method according to the invention, none of the keys used (secret key, intermediate keys, derived keys) is accessible by an SPA type attack. More specifically, an SPA type attack on the steps of the method corresponding to the derived key scheduling gives no relevant information on the secret key and/or on one of the intermediate keys $K_i$. or derived keys $M_i$. Indeed, the value of these keys is different at each implementation of the method, whatever the value of the input data or the secret key used by the method.

Figure 6:
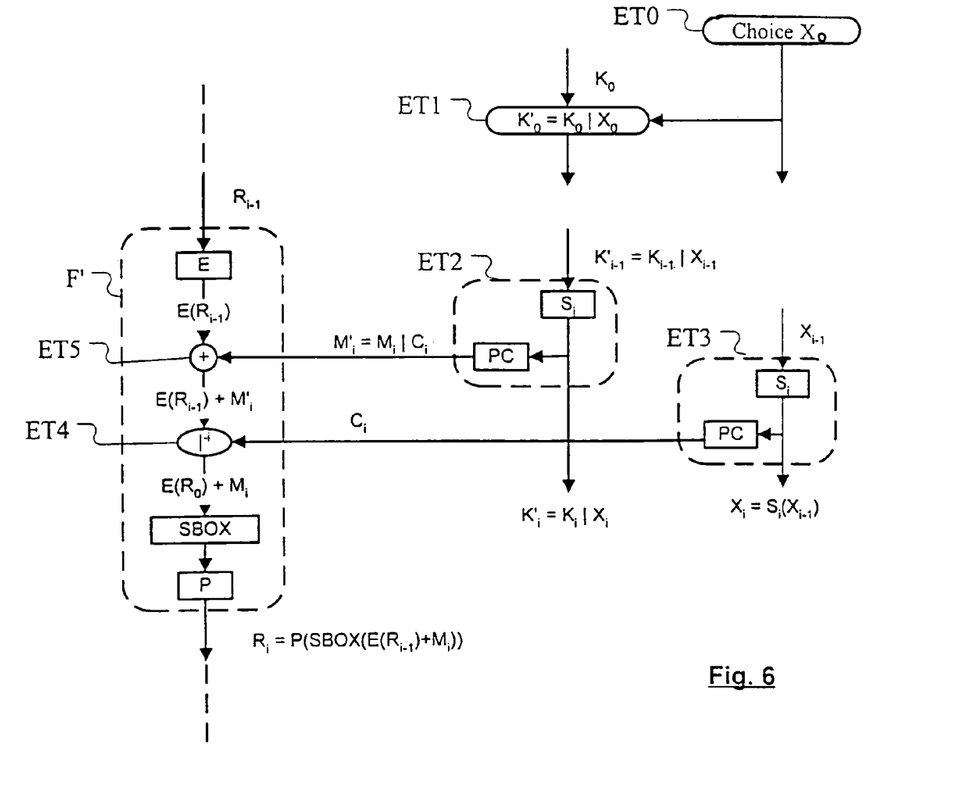
FIG. 6 is a schematic drawing illustrating a DES type method, secured according to the invention.

Modifications and/or improvements of the method of FIG. 6 are possible without departing from the scope of the invention. For example, in the DES method of FIG. 6, the key scheduling step ET2 and the difference computation step ET3 are performed during the round of operations that use the key $M'_i$ and the contribution $C_i$ that are produced by the steps ET2, ET3.

It is however possible to carry out the steps ET2, ET3 independently of the rounds of operations of the DES method. For example, it is possible to carry out all the steps ET2, ET3 during the phase of initialization of the method, after the step ET0 for choosing $X_0$. All the keys $M'_1$, $M'_{16}$, and all the contribution $C_1$ to $C_{16}$ are in this case stored and then given at each round of operations when they are used.

It must be noted finally that all the examples described here above must be considered as such and do not restrict the scope of the invention.

What is essential in the invention is to introduce a random parameter in an encryption method so that, during two cases of implementation of the method by a component, this component uses keys (secret keys, intermediate keys, derived keys, etc.) that are different, whatever the value of the input data and/or the secret key and/or the output data, and especially during two cases of implementation using the same input data and/or the same secret data and/or the same output data. Thus, by using different keys at each case of implementation of the method, the method leaves different traces. The method is thus insensitive to SPA attaches.

That which is claimed is:

1. A method for securing a cryptographic process that generates output data from input data and a private key, the method comprising:
    a key scheduling process comprising a plurality of derived key scheduling steps to each provide an updated derived key from a previously derived key computed during a preceding derived key scheduling step, a first updated derived key being obtained from the private key;
    masking the private key, prior to the key scheduling process, so that each updated derived key is different for each key scheduling process;
    wherein, during the masking step, a randomly chosen masking parameter is mixed with the private key, to provide a masked private key, the first updated derived key being computed from the masked private key during a first derived key scheduling step; and
    performing a plurality of computation steps, each using an updated derived key, and an unmasking step is executed after each computation step to eliminate a contribution of the masking parameter on a result of the previous computation step.

2. A method according to claim 1, wherein the masking step is carried out during an initialization step.

3. A method according to claim 1, further comprising: a computation step using an updated derived key, and an unmasking step, executed after the computation step, to eliminate a contribution of the masking parameter to a result of the computation step.

4. A method according to claim 3 wherein, during the masking step, the following operation is carried out:
    $K'_0 = K_0 \mid X_0$,
    $K'_0$ being the masked private key,
    $K_0$ being the private key $X_0$ being the masking parameter, and the operator "|" being a mixing operator.

5. A method according to claim 4, wherein the mixing operator comprises a two-parameter linear operator.

6. A method according to claim 4, wherein the mixing operator comprises an XOR operator.

7. A method according to claim 4 wherein, during the unmasking step, an inverse operator of the mixing operator is used.

8. A method according to claim 1, wherein the key scheduling process is a Data Encryption Standard (DES) type process, comprising sixteen rounds of key scheduling steps, each round using an updated derived key.

9. A method according to claim 8 wherein, at each round, a transformation is carried out, comprising:
- a computation step to combine an intermediate data computed during a previous round and the updated derived key, and
- an unmasking step executed after the computation step, to eliminate a contribution of the masking parameter to a result of the computation step.

10. A method for securing a cryptographic process that generates output data from input data and a private key, the method comprising:
masking the private key;
wherein, during the masking step, a randomly chosen masking parameter is mixed with the private key, to provide the masked private key, the first updated derived key being computed from the masked private key during a first derived key scheduling step;
performing a key scheduling process comprising a plurality of derived key scheduling steps to each provide an updated derived key from a previously derived key, a first updated derived key being obtained from the masked private key;
wherein each updated derived key is different for each key scheduling process; and
performing a plurality of computation steps, each using an updated derived key, and an unmasking step is executed after each computation step to eliminate a contribution of the masking parameter on a result of the previous computation step.

11. A method according to claim 10, wherein the masking step is carried out during an initialization step.

12. A method according to claim 10, further comprising: a computation step using an updated derived key; and an unmasking step, executed after the computation step, to eliminate a contribution of the masking parameter to a result of the computation step.

13. A method according to claim 12 wherein, during the masking step, the following operation is carried out:

$K'_0 = K_0 | X_0$, $K'_0$ being the masked private key, $K_0$ being the private key $X_0$ being the masking parameter, and the operator "|" being a mixing operator.

14. A method according to claim 13, wherein the mixing operator comprises a two-parameter linear operator.

15. A method according to claim 13, wherein the mixing operator comprises an XOR operator.

16. A method according to claim 13 wherein, during the unmasking step, an inverse operator of the mixing operator is used.

17. A method according to claim 10, wherein the key scheduling process is a Data Encryption Standard (DES) type process, comprising sixteen rounds of key scheduling steps, each round using an updated derived key.

18. A method according to claim 17 wherein, at each round, a transformation is carried out, comprising:
- a computation step to combine an intermediate data computed during a previous round and the updated derived key, and
- an unmasking step executed after the computation step, to eliminate a contribution of the masking parameter to a result of the computation step.

19. A electronic device comprising:
a controller for securing a cryptographic process that generates output data from input data and a private key, by masking the private key, and performing a key scheduling process comprising a plurality of derived key scheduling steps to each provide an updated derived key from a previously derived key, a first updated derived key being obtained from the masked private key;
wherein each updated derived key is different for each key scheduling process;
wherein the controller masks the private key with a randomly chosen masking parameter, the first updated derived key being computed from the masked private key during a first derived key scheduling step; and
wherein the controller performs a plurality of computation steps, each using an updated derived key, and an unmasking step is executed after each computation step to eliminate a contribution of the masking parameter on a result of the previous computation step.

20. A device according to claim 19, wherein the controller performs the masking during an initialization step.

21. A device according to claim 19, wherein the controller performs a computation step using an updated derived key, and an unmasking step, executed after the computation step, to eliminate a contribution of the masking parameter to a result of the computation step.

22. A device according to claim 21 wherein, during the masking step, the controller performs the following operation:

$K'_0 = K_0 | X_0$, $K'_0$ being the masked private key, $K_0$ being the private key $X_0$ being the masking parameter, and the operator "|" being a mixing operator.

23. A device according to claim 22, wherein the mixing operator comprises a two-parameter linear operator.

24. A device according to claim 22, wherein the mixing operator comprises an XOR operator.

25. A device according to claim 22 wherein, during the unmasking step, an inverse operator of the mixing operator is used.

26. A device according to claim 19, wherein the key scheduling process is a Data Encryption Standard (DES) type process, comprising sixteen rounds of key scheduling steps, each round using an updated derived key.

27. A device according to claim 26 wherein, at each round, the controller performs a transformation comprising:
- a computation step to combine an intermediate data computed during a previous round and the updated derived key; and
- an unmasking step executed after the computation step, to eliminate a contribution of the masking parameter to a result of the computation step.

* * * * *

UNITED STATES PATENT AND TRADEMARK OFFICE
CERTIFICATE OF CORRECTION

PATENT NO. : 7,400,723 B2
APPLICATION NO. : 10/467572
DATED : July 15, 2008
INVENTOR(S) : Romain et al.

It is certified that error appears in the above-identified patent and that said Letters Patent is hereby corrected as shown below:

| | |
|---|---|
| Column 1, Line 63 | Delete: "$M_i - M_i$"<br>Insert: -- $M_i \cdot M_i$ -- |
| Column 2, Line 9 | Delete: "$I_p^{-1}$"<br>Insert: -- $IP^{-1}$ -- |
| Column 2, Line 16 | Delete: "an"<br>Insert: -- a -- |
| Column 2, Line 20 | Delete: "time"<br>Insert: -- times -- |
| Column 3, Line 4 | Delete: "step"<br>Insert: -- steps -- |
| Column 5, Line 5 | Delete: "mthod"<br>Insert: -- method -- |
| Column 8, Line 2 | Delete: "$K_i.$"<br>Insert: -- $K_i$ -- |
| Column 8, Line 58 | Delete: "comprising: a"<br>Insert: -- comprising:<br>    a -- |
| Column 8, Line 59 | Delete: "and an"<br>Insert: -- and<br>    an -- |
| Column 9, Line 45 | Delete: "comprising: a"<br>Insert: -- comprising:<br>    a -- |

UNITED STATES PATENT AND TRADEMARK OFFICE
CERTIFICATE OF CORRECTION

PATENT NO. : 7,400,723 B2
APPLICATION NO. : 10/467572
DATED : July 15, 2008
INVENTOR(S) : Romain et al.

It is certified that error appears in the above-identified patent and that said Letters Patent is hereby corrected as shown below:

Column 9, Line 46

Delete: "and an"
Insert: -- and
      an --

Signed and Sealed this

Second Day of September, 2008

JON W. DUDAS
*Director of the United States Patent and Trademark Office*